(12) United States Patent
Lee et al.

(10) Patent No.: US 9,532,385 B2
(45) Date of Patent: Dec. 27, 2016

(54) METHOD AND APPARATUS FOR PERFORMING BACKOFF IN WIRELESS COMMUNICATION SYSTEM

(71) Applicant: LG Electronics Inc., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/437,328

(22) PCT Filed: Oct. 23, 2013

(86) PCT No.: PCT/KR2013/009484
§ 371 (c)(1),
(2) Date: Apr. 21, 2015

(87) PCT Pub. No.: WO2014/065593
PCT Pub. Date: May 1, 2014

(65) Prior Publication Data
US 2015/0282214 A1 Oct. 1, 2015

Related U.S. Application Data

(60) Provisional application No. 61/717,618, filed on Oct. 23, 2012.

(51) Int. Cl.
*H04W 74/08* (2009.01)
*H04W 74/00* (2009.01)

(52) U.S. Cl.
CPC ....... *H04W 74/0833* (2013.01); *H04W 74/085* (2013.01); *H04W 74/006* (2013.01)

(58) Field of Classification Search
CPC ... H04L 27/2613; H04L 5/0053; H04W 72/04; H04W 72/12; H04W 72/1284; H04W 74/006; H04W 74/0833
See application file for complete search history.

(56) References Cited

U.S. PATENT DOCUMENTS 8,014,805 B2 * 9/2011 Willenegger ....... H04W 74/002
455/509
2002/0154653 A1 * 10/2002 Benveniste ......... H04L 12/4013
370/447

(Continued)

FOREIGN PATENT DOCUMENTS

JP 5-75536 A 3/1993
WO 2008/149778 A1 12/2008

(Continued)

OTHER PUBLICATIONS

NTT Docomo Inc., "The necessity of access control in RRC_Connected," R2-124412, 3GPP TSG-RAN2#79bis, Bratislava, Slovakia, Oct. 8-12, 2012, see pp. 1-4.
3GPP TS 36.321 V11.0.0, "3GPP TSGRAN; E-UTRA; Medium Access Control (MAC) protocol specification (Release 11)," Sep. 2012, see pp. 13-17, 43-47.

(Continued)

*Primary Examiner* — Curtis A Alia
(74) *Attorney, Agent, or Firm* — Dentons US LLP

(57) ABSTRACT

A method and apparatus for performing backoff in a wireless communication system is provided. A user equipment (UE) identifies a prioritized access, receives a backoff parameter from a network, and determines whether or not to apply the received backoff parameter according to the prioritized access. The prioritized access corresponds to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

13 Claims, 13 Drawing Sheets

(56) References Cited

U.S. PATENT DOCUMENTS

| | | | | |
|---|---|---|---|---|
| 2011/0274040 A1* | 11/2011 | Pani | ................... | H04W 4/005 370/328 |
| 2012/0033613 A1 | 2/2012 | Lin et al. | | |

FOREIGN PATENT DOCUMENTS

| | | | | |
|---|---|---|---|---|
| WO | 2010107354 | | 9/2010 | |
| WO | WO2010107354 A1 * | | 9/2010 | ............ H04W 74/08 |
| WO | 2011/100596 A2 | | 8/2011 | |

OTHER PUBLICATIONS

3GPP TS 36.300 V11.3.0, "3GPP TSGRAN; E-UTRA, E-UTRAN; Overall description; Stage 2 (Release 11," Sep. 2012, see pp. 70-74, 182.

China Mobile, et al.: "Backoff for UEs of different priorities", R2-080750, 3GPP TSG-RAN WG#61, Sorrento, Italy, Feb. 1-15, 2008.

CMCC, et al.: "Differentiate access causes in RACH backoff—Further discussion", R2-081631, 3GPP TSG-RAN WG#61bis, Shenzhen, China, Mar. 31-Apr. 4, 2008.

CMCC, et al: "Differentiate access causes in Rach backoff", R2-082547, 3GPP TSG-RAN WG#62, Kansas City, USA, May 5-9, 2008.

Siemens: "Single mechanism RACH backoff control", R2-063200, 3GPP TSG-RAN WG2#56, Riga, Latvia, Nov. 6-10, 2006.

Siemens Networks: "Single mechanism RACH backoff control", R2-070190, 3GPP TSG-RAN WG2#56bis, Sorrento, Italy, Jan. 15-19, 2007.

Siemens Networks: "RACH backoff control", R2-070643, 3GPP TSG-RAN WG2#57, St. Louis, USA, Jan. 12-16, 2007.

* cited by examiner

METHOD AND APPARATUS FOR PERFORMING BACKOFF IN WIRELESS COMMUNICATION SYSTEM

This application is a 35 USC §371 National Stage entry of International Application No. PCT/KR2013/009484 filed on Oct. 23, 2013, and claims priority to U.S. Provisional Application No. 61/717,618 filed on Oct. 23, 2012, all of which are hereby incorporated by reference in their entireties as if fully set forth herein.

BACKGROUND OF THE INVENTION

Field of the Invention

The present invention relates to wireless communications, and more particularly, to a method and apparatus for performing backoff in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

Random access procedure in which a network for the first time knows that some user equipments (UEs) are trying to get access may be performed in 3GPP LTE. At this stage, the UE does not have any resource or channel available to inform the network about its desire to connect to it, so it will transmit its request over the shared medium. Now there are two possibilities at this stage, either there are many other UEs in the same area (same cell) transmitting same request in which there is also a possibility of collision among the requests coming from various other UEs. Such random access procedure is called contention based random access procedure. In second scenario, the network can inform the UE to use some unique identity to prevent its request from colliding with requests coming from other UEs. The second scenario is called contention free or non-contention based random access procedure.

Meanwhile, backoff may be performed for the random access procedure. Backoff means that transmission of a random access preamble is delayed if a random access response reception and/or contention resolution in the random access procedure is considered not successful.

A method for performing backoff efficiently may be required.

SUMMARY OF THE INVENTION

The present invention provides a method for performing backoff in a wireless communication system. The present invention provides a method for determining whether to apply a backoff parameter according to a prioritized access. The present invention provides a method for ignoring a backoff parameter for a prioritized access.

In an aspect, a method for performing, by a user equipment (UE), backoff in a wireless communication system is provided. The method includes identifying a prioritized access, receiving a backoff parameter from a network, and determining whether or not to apply the received backoff parameter according to the prioritized access.

The prioritized access may correspond to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

It may be determined not to apply the received backoff parameter if the prioritized access is identified. The method may further include ignoring the received backoff parameter before transmitting a random access preamble to the network.

It may be determined to apply the received backoff parameter if the prioritized access is not identified. The method may further include performing backoff based on the received backoff parameter before transmitting a random access preamble to the network.

It may be determined not to apply the received backoff parameter for the prioritized access if the received backoff parameter has a larger value than a specific value.

It may be determined to apply the received backoff parameter for the prioritized access if the received backoff parameter has a value equal to a specific value or a lower value than the specific value.

The method may further include receiving a probability factor from the network, and wherein whether or not to apply the received backoff parameter is determined further according to the received probability factor.

The method may further include receiving an indication of one or more access classes from the network, and wherein whether or not to apply the received backoff parameter is determined further according to the indication of one or more access classes.

The method may further include receiving a backoff configuration from the network via one of system information, a paging, and a radio resource control (RRC) connection reconfiguration message.

The backoff configuration may indicate the prioritized access.

In another aspect, a user equipment (UE) in a wireless communication system is provided. The UE includes a radio frequency (RF) unit for transmitting or receiving a radio signal, and a processor coupled to the RF unit, and configured to identify a prioritized access, receive a backoff parameter from a network, and determine whether or not to apply the received backoff parameter according to the prioritized access.

Important access trials can avoid blocking.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
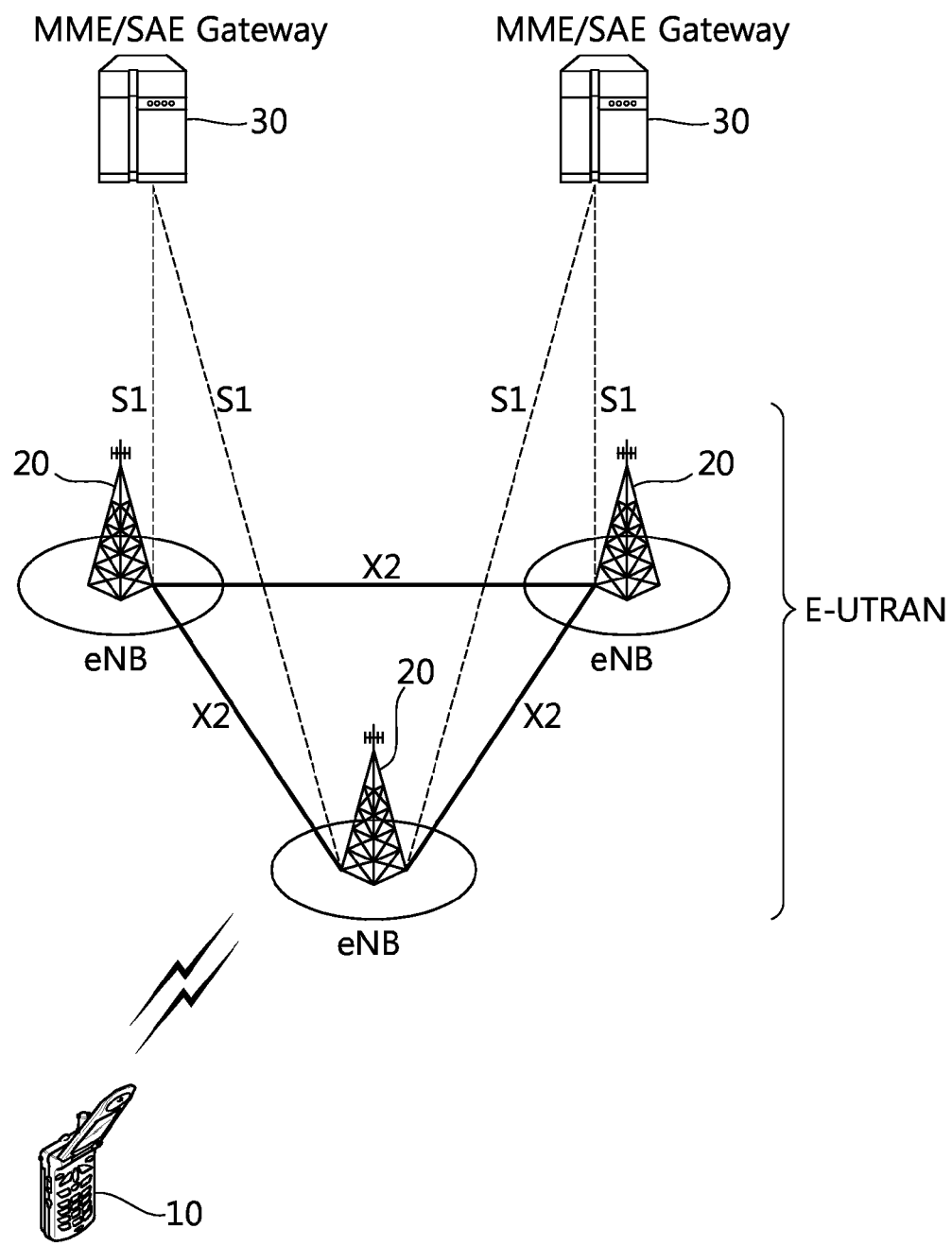
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 may be generally a fixed station that communicates with the UE 10 and may be referred to as another terminology, such as an evolved node-B (eNB), a base transceiver system (BTS), an access point, etc. There may be one or more cells within the coverage of the BS 20. A single cell may be configured to have one of bandwidths selected from 1.25, 2.5, 5, 10, and 20 MHz, etc., and may provide downlink or uplink transmission services to several UEs. In this case, different cells may be configured to provide different bandwidths.

Interfaces for transmitting user traffic or control traffic may be used between the BSs 20. The UE 10 and the BS 20 may be connected by means of a Uu interface. The BSs 20 may be interconnected by means of an X2 interface. The BSs 20 may be connected to an evolved packet core (EPC) by means of an S1 interface. The EPC may consist of a mobility management entity (MME), a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The MME is in charge of functionality of a control plane. The S-GW is in charge of functionality of a user plane. The BSs 20 may be connected to the MME 30 by means of an S1-MME interface, and may be connected to the S-GW by means of an S1-U interface. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
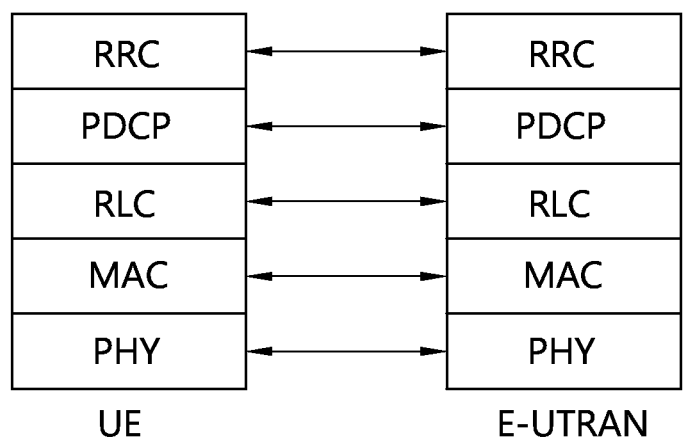
FIG. 2 is a diagram showing radio interface protocol architecture for a control plane.
Figure 3:
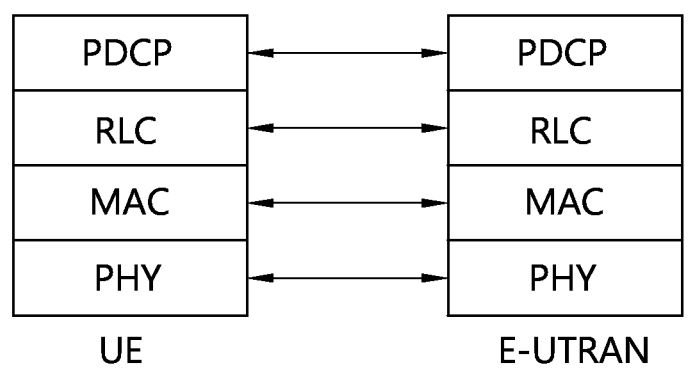
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN are classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane which is a protocol stack for control signal transmission and a user plane which is a protocol stack for data information transmission. The layers of the radio interface protocol may exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data may be transferred between the MAC layer and the PHY layer through the transport channel. The transport channel may be classified according to how and with what characteristics data is transmitted through a radio interface. Or, the transport channel may be classified into a dedicated transport channel and a common transport channel depending on whether or not to share the transport channel. Between different PHY layers, i.e., a PHY layer of a transmitter and a PHY layer of a receiver, data may be transferred through the physical channel. The physical channel may be modulated using an orthogonal frequency division multiplexing (OFDM) scheme, and utilizes time and frequency as a radio resource.

Figure 4:
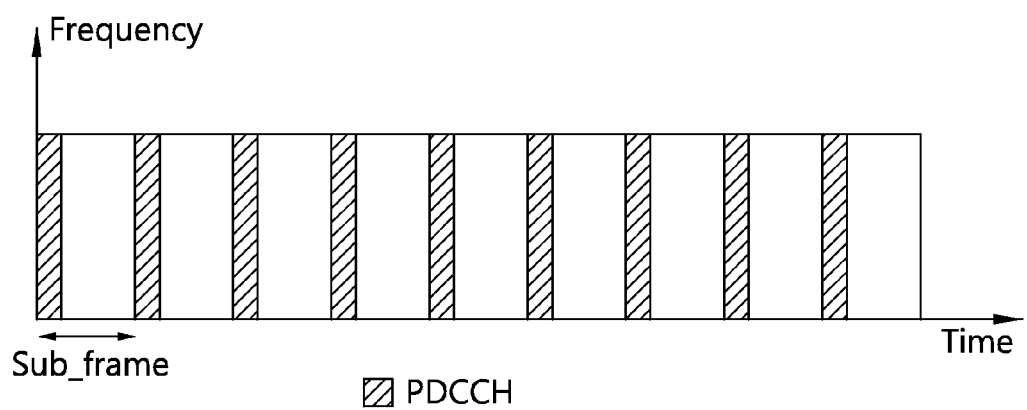
FIG. 4 shows an example of a physical channel structure.

FIG. 4 shows an example of a physical channel structure.

A physical channel may consist of a plurality of subframes in a time domain and a plurality of subcarriers in a frequency domain. One subframe may consist of a plurality of symbols in the time domain. One subframe may consist of a plurality of resource blocks (RBs). One RB may consist of a plurality of symbols and a plurality of subcarriers. In addition, each subframe may use specific subcarriers of specific symbols of a corresponding subframe for a physical downlink control channel (PDCCH). For example, a first symbol of the subframe may be used for the PDCCH. A transmission time interval (TTI) which is a unit time for data transmission may be equal to a length of one subframe.

A MAC layer belonging to the L2 provides a service to a higher layer, i.e., a radio link control (RLC), through a logical channel. A function of the MAC layer includes mapping between logical channels and transport channels and multiplexing/de-multiplexing for a transport block provided to a physical channel on a transport channel of a MAC service data unit (SDU) belonging to the logical channels. The logical channels are located above the transport channels, and are mapped to the transport channels. The logical channels may be divided into control channels for delivering information of the control plane and traffic channels for delivering information of the user plane.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC of a user equipment (UE) is logically connected to an RRC of an E-UTRAN. When an RRC connection is established between an RRC layer of the UE and an RRC layer of the E-UTRAN, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN can recognize the existence of the UE in RRC_CONNECTED and can effectively control the UE. Meanwhile, the UE in RRC_IDLE cannot be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE may establish the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A random access (RA) procedure is described below. It may be referred to Section 5.1 of 3GPP TS 36.321 V9.2.0 (2009-12) and Section 10.1.5 of 3GPP Ts 36.300 V9.2.0 (2009-12).

The random access procedure is characterized by:
  Common procedure for frequency division duplex (FDD) and time division duplex (TDD);
  One procedure irrespective of cell size and the number of serving cells when carrier aggregation (CA) is configured;

The random access procedure is performed for the following six events:
  Initial access from RRC_IDLE;
  RRC connection re-establishment procedure;
  Handover;
  DL data arrival during RRC_CONNECTED requiring random access procedure (e.g., when UL synchronization status is "non-synchronized")
  UL data arrival during RRC_CONNECTED requiring random access procedure (e.g., when UL synchronization status is "non-synchronized" or there are no PUCCH resources for scheduling request (SR) available.
  For positioning purpose during RRC_CONNECTED requiring random access procedure (e.g., when timing advance is needed for UE positioning)

Furthermore, the random access procedure takes two distinct forms:
  Contention based (applicable to first five events);
  Non-contention based (applicable to only handover, DL data arrival and positioning).

In other words, the random access procedure includes a contention based random access procedure that a UE randomly selects one random access preamble from a particular set and uses the same and a non-contention based random access procedure that a UE uses a random access preamble allocated thereto. A difference between the two random access procedures lies in a generation of collision due to contention as described hereinafter.

Normal DL/UL transmission can take place after the random access procedure.

Figure 5:
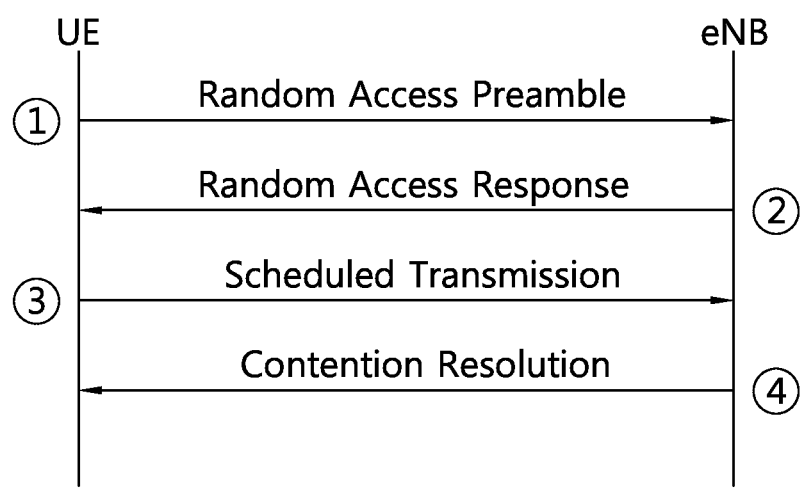
FIG. 5 shows an example of a contention based random access procedure.

FIG. 5 shows an example of a contention based random access procedure.

1. A random access preamble is transmitted on a random access channel (RACH) in uplink. The random access preamble may be called "message 1". In detail, a UE randomly selects one random access from a set of random access preambles indicated by system information or a handover command, selects a physical random access channel (PRACH) resource able to transmit the random access preamble, and transmits the same.

2. After the random access preamble is transmitted, the UE attempts to receive a random access response, which is generated by MAC, on a DL-SCH. The random access response may be called "message 2". The random access response may be semi-synchronous with the random access preamble. That is, the random access response may be received within a flexible window indicated by the system information or the handover command of which a size is one or more TTI. In detail, the random access response may not use hybrid automatic repeat request (HARQ). The random access response may be addressed to a random access radio network temporary identifier (RA-RNTI) on a PDCCH. The random access response may convey at least one of a random access preamble identifier (ID), timing alignment information, initial UL grant and assignment of a temporary cell RNTI (C-RNTI) (which may or may not be made permanent upon contention resolution).

In the above, the reason why the random access preamble identifier is required is because, since a single random access response may include random access response information for one or more UEs, so the random access preamble identifier informs for which UE the UL grant, temporary C-RNTI, and timing alignment information are valid. The random access preamble identifier is identical to the random access preamble selected by the UE in 1.

3. When the UE receives the random access response valid for the UE, the UE performs a first scheduled UL transmission on a UL-SCH. The scheduled UL transmission may be called "message 3". The scheduled UL transmission may use HARQ. A size of transport blocks depends on the UL grant conveyed in the random access response and is at least 80 bits. Also, the UE processes the information items included in the random access response. Namely, the UE applies the timing alignment information and stores the temporary C-RNTI. Also, the UE transmits data stored in a buffer of the UE or newly generated data to the BS by using the UL grant. In this case, an identifier of the UE should be included in the data included in the UL grant. The reason is because, in the contention based random access procedure, the BS cannot determine which UEs perform the random access procedure, so in order to resolve collision later, the BS should identify UEs.

Also, there are two types of methods for including an identifier of the UE. A first method is that when the UE has a valid cell identifier already allocated in the corresponding cell before the random access procedure, the UE transmits its cell identifier through the UL grant. Meanwhile, when the UE has not been allocated a valid cell identifier before the random access procedure, the UE includes its unique identifier (e.g., a SAE temporary mobile subscriber identifier (S-TMSI) or a random ID) in data and transmits the same. In general, the unique identifier is longer than a cell identifier. When the UE transmits the data through the UL grant, the UE starts a contention resolution timer.

4. After the UE performs the scheduled UL transmission data including its identifier through the UL grant included in the random access response, the UE performs contention resolution on DL. The UE may receive a contention resolution message from the BS. The contention resolution message may be called "message 4". The contention resolution message may not be synchronized with the scheduled UL transmission. HARQ may be supported for the contention resolution message. The contention resolution message may be addressed to the temporary C-RNTI on the PDCCH for initial access and after radio link failure. It may correspond to the case that the UE has not been allocated a valid cell identifier before the random access procedure. Or, the contention resolution message may be addressed to the C-RNTI on the PDCCH for UE in RRC_CONNECTED. It may correspond to the case that the UE has a valid cell identifier. HARQ feedback may be transmitted only by the UE which detects its own UE identity, as provided in the scheduled UL transmission, echoed in the contention resolution message.

Thereafter, for the former case, when the contention resolution message is addressed to the temporary C-RNTI before the contention resolution time expires, the UE determines that the random access procedure has been normally performed, and terminates the random access procedure. The temporary C-RNTI may be promoted to the C-RNTI for a UE which detects random access success and does not already have a C-RNTI. It is dropped by others. For the latter case, when the contention resolution message is addressed to the C-RNTI before the contention resolution timer expires, the UE determines that the random access procedure has been normally performed, and terminates the random access procedure. A UE which detects random access success and already has a C-RNTI, resumes using its C-RNTI.

Figure 6:
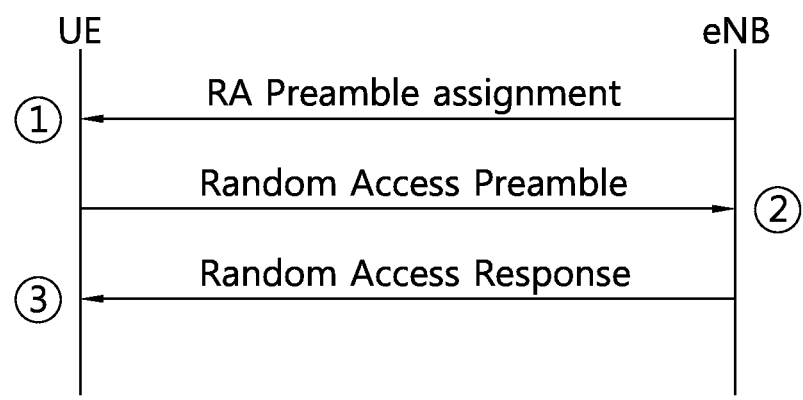
FIG. 6 shows an example of a non-contention based random access procedure.

FIG. 6 shows an example of a non-contention based random access procedure.

1. A random access preamble is assigned via dedicated signaling in DL. In detail, a BS assigns to a UE a non-contention random access preamble, i.e., a random access preamble not within a set transmitted in broadcast signaling. The non-contention random access preamble may be signaled via a handover command generated by a target eNB and transmitted via source eNB for handover, or a PDCCH in case of DL data arrival or positioning.

2. The random access preamble is transmitted on a RACH in uplink. That is, the UE transmits the assigned non-contention random access preamble to the BS.

3. After the assigned random access preamble is transmitted, the UE attempts to receive a random access response on a DL-SCH. The random access response may be semi-synchronous with the random access preamble. The random access response may not use HARQ. The random access response may be addressed to an RA-RNTI on a PDCCH. The random access response may convey at least one of timing alignment information and initial UL grant for handover, timing alignment information for DL data arrival, an RA-preamble identifier, and intended for one or multiple UEs in one DL-SCH message.

In comparison to the contention based random access procedure, in the non-contention based random access procedure, upon receiving random access response information, it is determined that a random access procedure has been normally performed, and the random access procedure is terminated.

Figure 7:
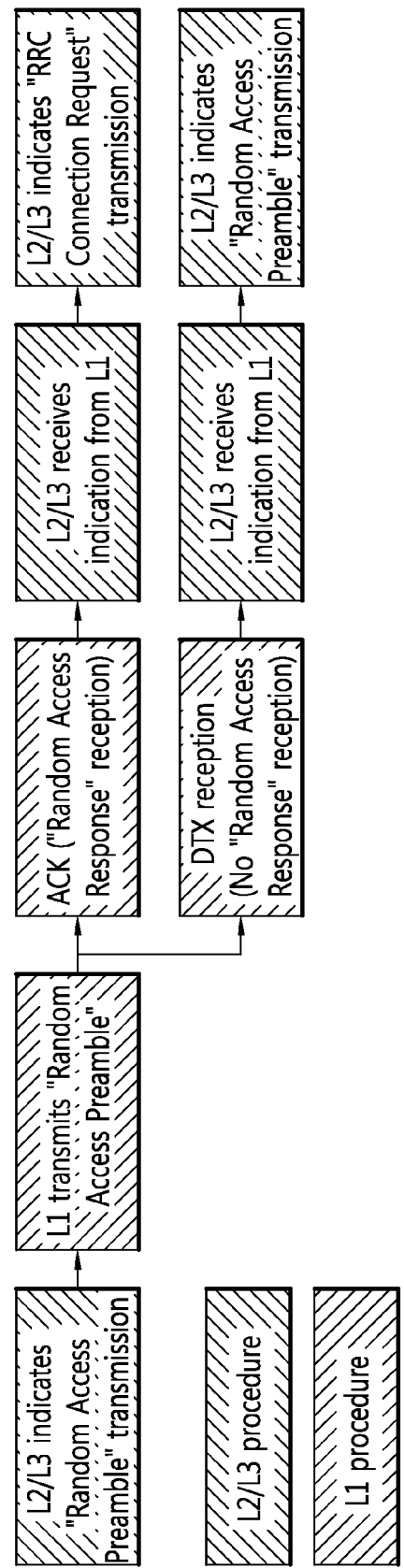
FIG. 7 shows interaction model between L1 and L2/L3 for a random access procedure.

FIG. 7 shows interaction model between L1 and L2/L3 for a random access procedure.

Referring to FIG. 7, L2/L3 indicates random access preamble transmission to L1. Accordingly, L1 transmits a random access preamble. L2/L3 receives indication from L1 whether acknowledgement (ACK) is received or discontinuous transmission (DTX) is detected after indication of the random access preamble transmission to L1. L2/L3 indicates L1 to transmit first scheduled UL transmission (RRC connection request in case of initial access) if necessary or random access preamble based on the indication from L1.

In the random access procedure, backoff may be performed. In detail, in a random access procedure initialization, a backoff parameter value in the UE is set to 0 ms. In random access response reception, the UE may stop monitoring for random access response(s) after successful reception of the random access response containing random access preamble identifiers that matches the transmitted random access preamble. In this case, if the random access response contains a backoff indicator (BI) subheader, the backoff parameter value in the UE is set as indicated by a BI field of the BI subheader. Else, the backoff parameter value in the UE is set to 0 ms. The backoff parameter values may be presented by Table 1.

TABLE 1

| Index | Backoff Parameter value (ms) |
| --- | --- |
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

The reserved values of the backoff parameter if received by the current release version UEs shall be taken as 960 ms.

If no random access response is received within the random access response window, or if none of all received random access responses contains a random access preamble identifier corresponding to the transmitted random access preamble, the random access response reception is considered not successful. In this case, the UE selects a random backoff time according to a uniform distribution between 0 and the packoff parameter value based on the backoff parameter in the UE, and delays the subsequent random access transmission by the backoff time.

Or, in the contention resolution, if the contention resolution is considered not successful, the UE selects a random backoff time according to a uniform distribution between 0 and the backoff parameter value based on based on the backoff parameter in the UE, and delays the subsequent random access transmission by the backoff time.

When uplink congestion occurs at a cell, important access trials as well as normal access trials can be blocked. Specifically, according to the prior art, backoff may be performed for a random access procedure for important access trials as well as a random access procedure for normal access trials. Accordingly, a method for performing backoff based on a priority of access may be proposed.

Figure 8:
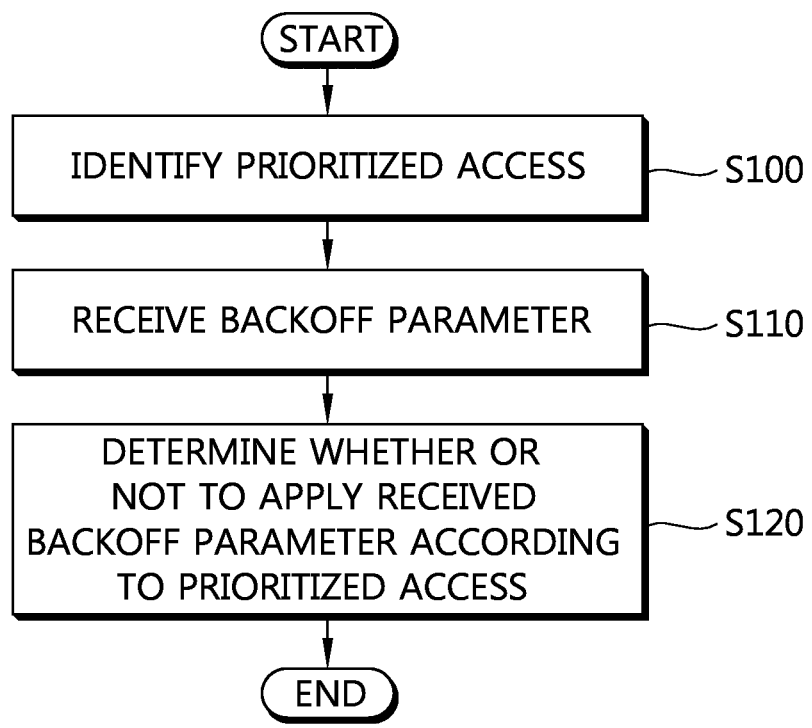
FIG. 8 shows an example of performing backoff according to an embodiment of the present invention.

FIG. 8 shows an example of performing backoff according to an embodiment of the present invention.

At step S100, the UE identifies a prioritized access. The prioritized access may correspond to an establishment cause including emergency access or high priority access, when the UE is in RRC_IDLE. Therefore, in this case, the non-prioritized access may correspond to an establishment cause other than emergency access and high priority access, i.e., one of mobile terminating (MT) access, mobile originating (MO) data, MO signaling and delay tolerant access. Or, the prioritized access may correspond to a logical channel, traffic/bearer type, or logical channel priority including at least one of control element/information in MAC, RLC or PDCP, a DRB for voice/video service, SRB 0, SRB 1 and SRB 2, when the UE is in RRC_CONNECTED.

At step S110, the UE receives a backoff parameter.

At step S120, the UE determines whether or not to apply the received backoff parameter according to the prioritized access. If the prioritized access is identified, the UE determines not to apply the received backoff parameter. That is, the UE ignores the received backoff parameter before transmitting a random access preamble if the prioritized access is identified. If the prioritized access is not identified, the UE determines to apply the received backoff parameter. That is, the UE performs backoff based on the received backoff parameter before transmitting a random access preamble if the prioritized access is not identified.

Alternatively, the UE may ignore the received backoff parameter for the prioritized access if the received backoff parameter has a larger value than the specific value. The UE may perform backoff based on the received backoff parameter if the received backoff parameter has a value equal to the specific value or a lower value than the specific value. The specific value may be 960 ms.

Alternatively, the UE may further receive a probability factor as well as the backoff parameter, and may determine whether or not to apply the received backoff parameter based on the received probability factor. Or, the UE may further receive an indication of one or more access classes as well as the backoff parameter, and may perform backoff when the indicated access class is equal to UE's access class. Or, the UE may further receive a scaling factor, and may perform backoff for the prioritized access based on the received backoff parameter and the received scaling factor. That is, the UE may perform backoff based on a value corresponding to (backoff parameter*scaling factor).

Alternatively, the UE may identify to which logical channel the triggered random access belongs, and may decide whether or not to ignore the received backoff parameter according to the identified logical channel.

Figure 9:
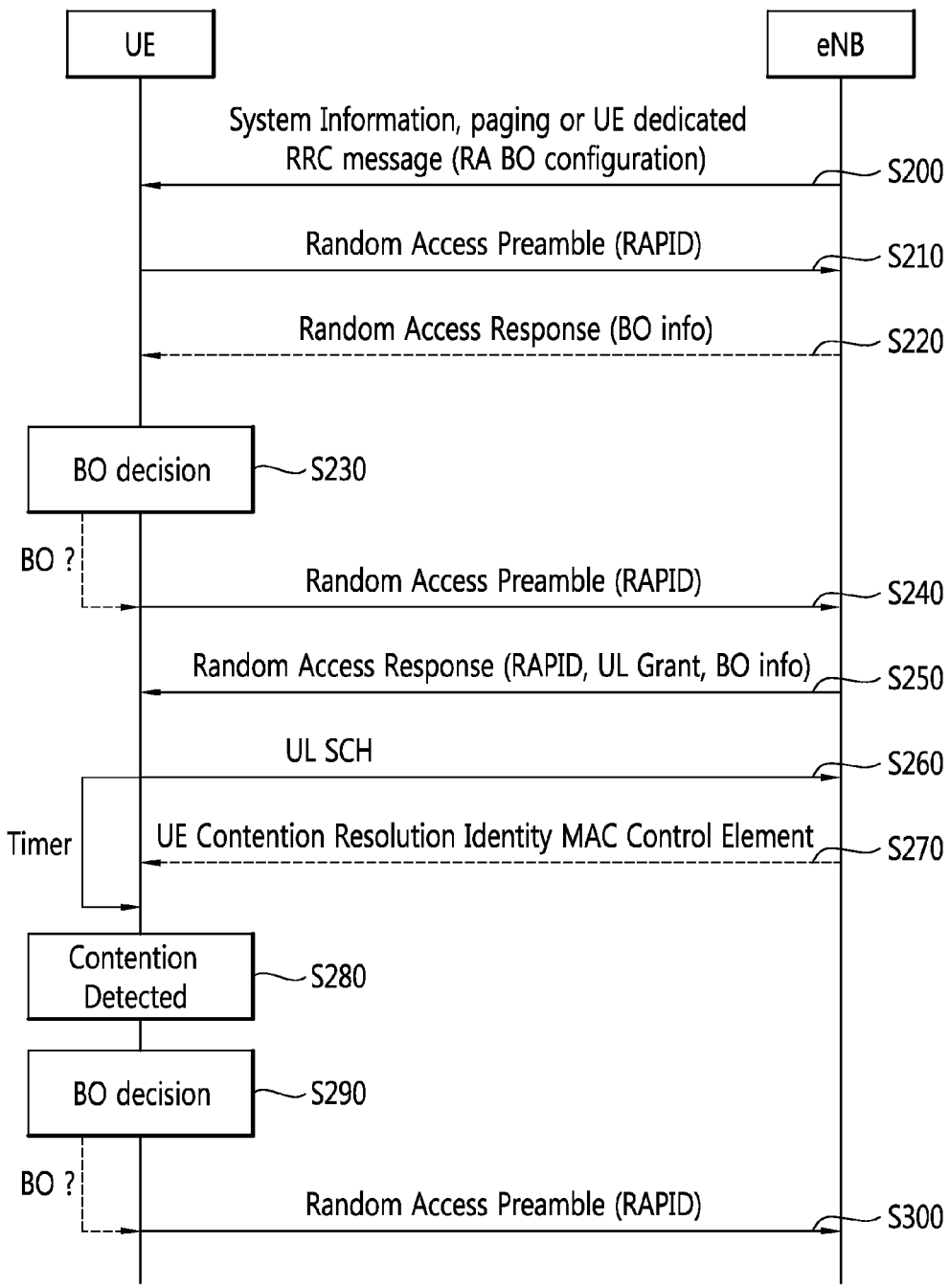
FIG. 9 shows another example of performing backoff according to an embodiment of the present invention.

FIG. 9 shows another example of performing backoff according to an embodiment of the present invention.

At step S200, the UE receives a backoff configuration of a random access via system information, paging, or UE dedicated RRC message, such as an RRC connection reconfiguration message. If the system information is used to carry the backoff configuration, the paging may be used to indicate whether or not the backoff configuration is carried in the system information.

The backoff configuration may indicate whether or not this cell supports ignoring backoff according to the embodiment of the present invention. That is, only if the backoff configuration indicates that this cell supports ignoring backoff according to the embodiment of the present invention, the UE may perform backoff according to the embodiment of the present invention. Otherwise, the UE may perform backoff according to the prior art.

In addition, the backoff configuration can inform UEs for which establishment cause or traffic/bearer type UEs ignore backoff or apply a specific backoff parameter before (re-)transmitting a random access preamble when UEs need to perform backoff. For instance, the backoff configuration can indicate one or some of emergency access, high priority access, multimedia telephony service (MMTel)-voice, MMTEL-video, and voice over LTE (VoLTE). If the UE receives this backoff configuration, and if the UE has accessed for one of the indicated ones, the UE ignores backoff during random access or applies a special backoff parameter before (re-)transmitting a random access preamble.

Alternatively, the backoff configuration can indicate one or some of MO-data, MT access, MMTEL-other, and data service. If the UE receives this backoff configuration, and if the UE has accessed for one of the indicated ones, the UE applies backoff according to the existing backoff parameter of random access response before (re-)transmitting a random access preamble. Otherwise, the UE ignores backoff during random access or applies a special backoff parameter before (re-)transmitting a random access preamble.

The special backoff parameter may be provided via a random access response, system information, or UE dedicated RRC message. If it is provided via the random access response, the special backoff parameter as well as the existing backoff parameter can be provided together in one random access response message.

At step S210, upon an RRC connection establishment, RRC connection re-establishment, handover, UL data arrival, or PDCCH order, the UE performs random access by transmitting a random access preamble to the eNB. The random access preamble includes a random access preamble identifier (RAPID) that the UE randomly selects.

At step S220, upon receiving the random access preamble, the eNB may respond by transmitting a random access response (RAR). The UE may receive backoff information via the random access response, paging, system information or UE dedicated message, and then store the received backoff information. If the system information is used to carry the backoff information, the paging may be used to indicate whether or not the backoff information is carried in the system information.

If the received random access response contains the corresponding RAPID that the UE previously transmitted in the random access preamble, the UE transmits a message 3 on a UL SCH. Otherwise, the UE may re-transmit a random access preamble with or without backoff, as described below.

At step S230, the UE decides whether or not to perform backoff. The received backoff information includes at least backoff parameter. The eNB may indicate a reserved value of the backoff parameter to indicate a larger value than 960 ms.

It is assumed that the UE does not receive the corresponding RAPID in the received random access response after transmitting a random access preamble including the RAPID, and the UE receives the backoff parameter.

If the UE in RRC_IDLE is establishing an RRC connection or the UE in RRC_CONNECTED has established this RRC connection for an establishment cause set to one of 'emergency access' and 'high priority access'; or, if the UE in RRC_IDLE is establishing an RRC connection or the UE in RRC_CONNECTED has established this RRC connection for one or some of emergency access, high priority access, MMTEL-voice, MMTEL-video, and VoLTE; or, if the UE is establishing or has established bearers for one or some of emergency access, high priority access, MMTEL-voice, MMTEL-video, and VoLTE; or if the UE initiates this random access to transmit a buffer status report for a specific logical channel, a specific logical channel group, or an SRB (and if the specific logical channel or the specific logical channel group is indicated via system information, paging, or random access response); or if the UE initiates this random access to transmit MAC control element or control information in RLC/PDCP; or if the UE initiates this random access to transmit a NAS message or RRC message, the UE ignores the received backoff parameter and transmits a random access preamble without backoff. Or, if the UE receives the existing backoff parameter, and if the backoff parameter has a larger value than 960 ms, the UE applies backoff with 960 ms and then transmits a random access preamble after backoff. But, if the backoff parameter value is 960 ms or less, the UE applies backoff with the value and then transmits a random access preamble after backoff. Or, if the UE receives the special backoff parameter, the UE applies the received special backoff parameter and then transmits a preamble after backoff.

Else, the UE applies the (existing) backoff parameter and then transmits a random access preamble after backoff.

If the UE does not receive the backoff parameter, the UE transmits a random access preamble without backoff.

At step S240, the UE may transmit a random access preamble including a RAPID with or without backoff according to the step S230.

At step S250, in response to the random access preamble, the eNB may respond by transmitting the random access response that may include the RAPID, UL grant, and backoff information.

If the UE receives the corresponding RAPID in the received random access response after transmitting a random access preamble including the RAPID, at step S260, the UE performs scheduled UL transmission on a UL-SCH according to the UL grant contained in the random access response. For RRC connection establishment, the UE transmits an RRC connection request message on the UL-SCH. For RRC connection re-establishment, the UE transmits an RRC connection re-establishment request message on the UL-SCH. For handover, the UE transmits an RRC connection reconfiguration complete message on the UL-SCH to a target eNB. For UL data arrival, the UE may transmit a buffer status report, C-RNTI MAC control element, and user data on the UL-SCH. For PDCCH order, the UE may transmit MAC control element and user data on the UL-SCH.

Once the UE performs the scheduled UL transmission on the UL-SCH, the UE starts a timer, i.e., mac-ContentionResolutionTimer.

At step S270, for contention resolution, UE may receive a UE contention resolution identity MAC control element. Based on the UE contention resolution identity MAC control element, the UE may decide whether or not contention is resolved.

If contention is not resolved until the timer is expired, at step S280, the UE considers the contention resolution not successful.

If the contention resolution is not successful, at step S290, the UE performs transmission of random access preamble as follows. It is assumed that the UE receives the backoff parameter.

If the UE in RRC_IDLE is establishing an RRC connection or the UE in RRC_CONNECTED has established this RRC connection for an establishment cause set to one of 'emergency access' and 'high priority access'; or, if the UE in RRC_IDLE is establishing an RRC connection or the UE in RRC_CONNECTED has established this RRC connection for one or some of emergency access, high priority access, MMTEL-voice, MMTEL-video, and VoLTE; or, if the UE is establishing or has established bearers for one or some of emergency access, high priority access, MMTEL-voice, MMTEL-video, and VoLTE; or if the UE initiates this random access to transmit a buffer status report for a specific logical channel, a specific logical channel group, or an SRB (and if the specific logical channel or the specific logical channel group is indicated via system information, paging, or random access response); or if the UE initiates this random access to transmit MAC control element or control information in RLC/PDCP; or if the UE initiates this random access to transmit a NAS message or RRC message, the UE ignores the received backoff parameter and transmits a random access preamble without backoff. Or, if the UE receives the existing backoff parameter, and if the backoff parameter has a larger value than 960 ms, the UE applies backoff with 960 ms and then transmits a random access preamble after backoff. But, if the backoff parameter value is 960 ms or less, the UE applies backoff with the value and then transmits a random access preamble after backoff. Or, if the UE receives the special backoff parameter, the UE applies the received special backoff parameter and then transmits a preamble after backoff.

Else, the UE applies the (existing) backoff parameter and then transmits a random access preamble after backoff.

If the UE does not receive the backoff parameter, the UE transmits a random access preamble without backoff.

At step S300, the UE may transmit a random access preamble including a RAPID with or without backoff according to the previous steps.

As described above, the special backoff parameter may be used for applying backoff. There may be two methods for including the special backoff parameter in the random access response.

1) When the UE performs random access for emergency access, high priority access, MMTEL-voice, MMTEL-video, or VoLTE, the UE may monitor a special RA-RNTI that is used to indicate transmission of special RAR. The special RAR does not include any response to random access for UEs accessing to the cell for emergency access, high priority access, MMTEL-voice, MMTEL-video, or VoLTE. The MAC subheader of the special RAR includes a special backoff indicator field that includes the special backoff parameter value.

2) If the special RA-RNTI is not used, a MAC protocol data unit (PDU) for a random access response includes a special backoff indicator field in the MAC subheader.

Figure 10:
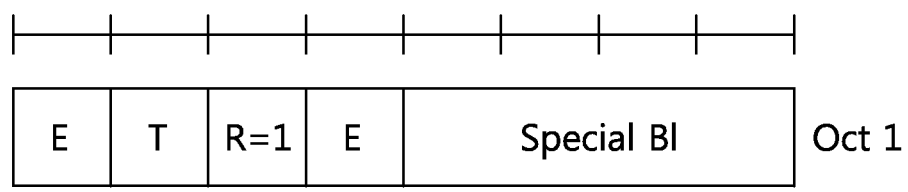
FIG. 10 shows an example of a MAC subheader 2 for a special backoff parameter according to an embodiment of the present invention.

FIG. 10 shows an example of a MAC subheader 2 for a special backoff parameter according to an embodiment of the present invention.

Referring to FIG. 10, the first and/or the second R bit is set to 1 for indicating subsequent special backoff indicator field that includes a special backoff parameter value.

Figure 11:
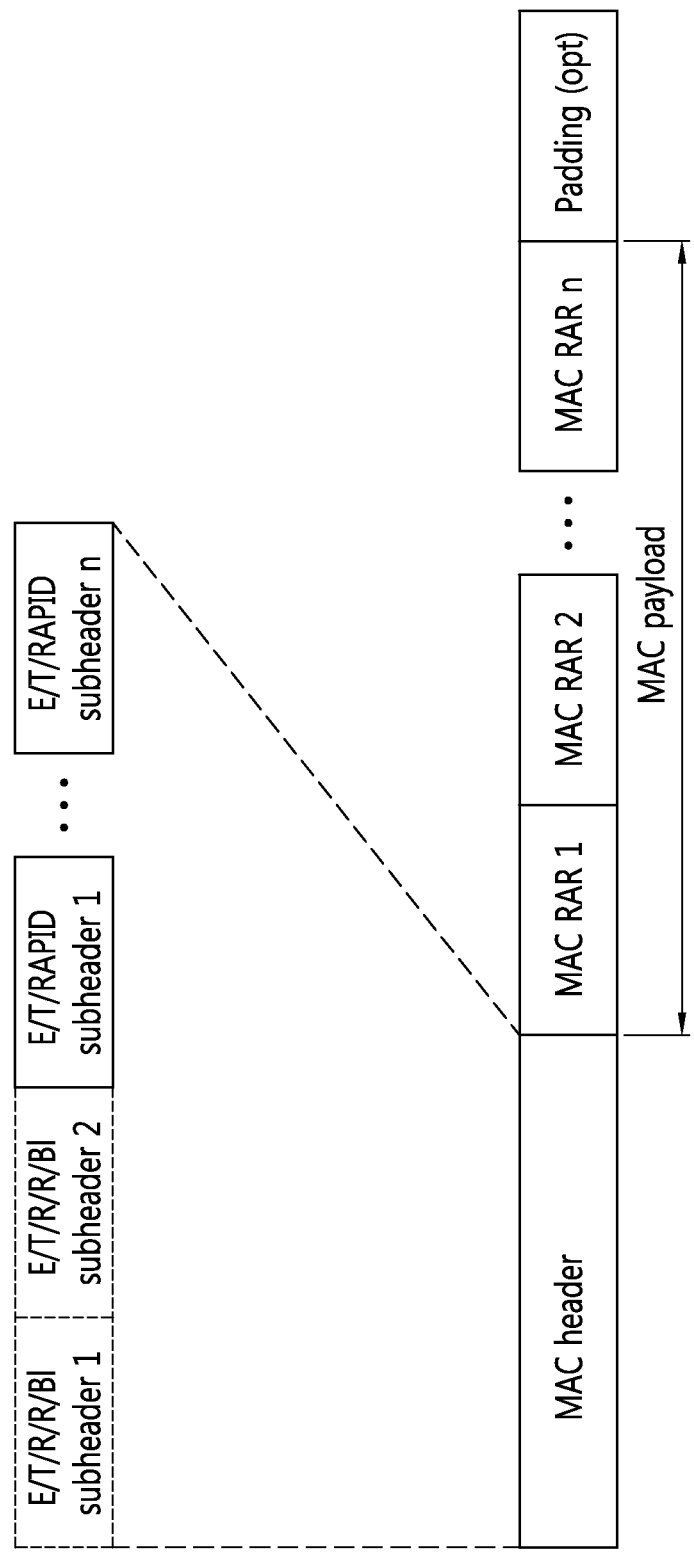
FIG. 11 shows an example of a MAC PDU consisting of a MAC header and MAC RARs according to an embodiment of the present invention.

FIG. 11 shows an example of a MAC PDU consisting of a MAC header and MAC RARs according to an embodiment of the present invention.

Referring to FIG. 11, a MAC header includes a second E/T/R/R/BI MAC subheader as well as a first E/T/R/R/BI MAC subheader. If there is the second E/T/R/R/BI MAC subheader in the MAC header, the second E/T/R/R/BI MAC subheader corresponds to E/T/R/R/BI MAC subheader 2 for special backoff parameter described in FIG. 10.

3) If the special RA-RNTI is not used, a MAC PDU for a random access response includes a special backoff indicator field in the padding. When the UE accessing to the cell for emergency access, high priority access, MMTEL-voice, MMTEL-video, or VoLTE transmits a random access preamble to the cell, the UE always checks the padding in the MAC PDU for the random access response to acquire the special backoff parameter.

Figure 12:
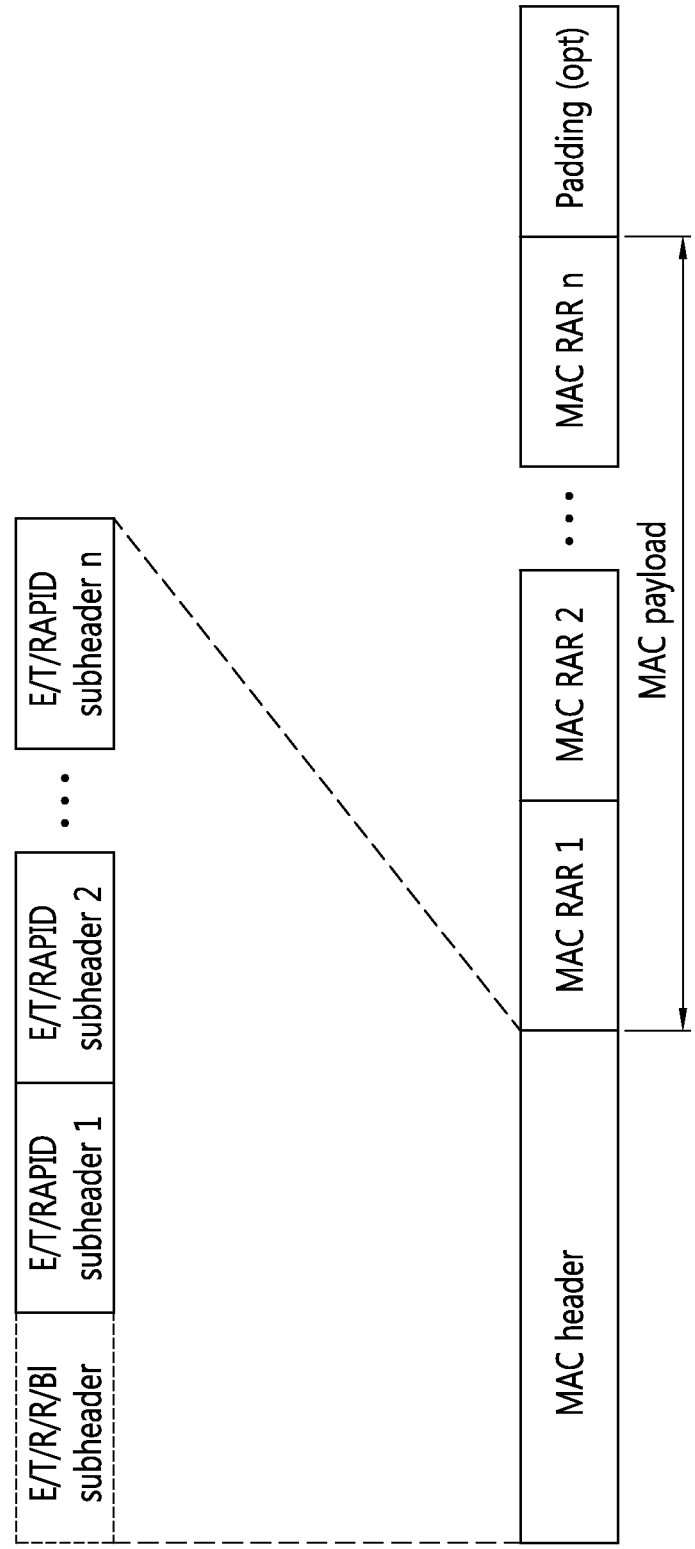
FIG. 12 shows another example of a MAC PDU consisting of a MAC header and MAC RARs according to an embodiment of the present invention.

FIG. 12 shows another example of a MAC PDU consisting of a MAC header and MAC RARs according to an embodiment of the present invention.

Referring to FIG. 12, the MAC PDU includes the padding, and the padding includes the special backoff indicator field including the special backoff parameter value.

Figure 13:
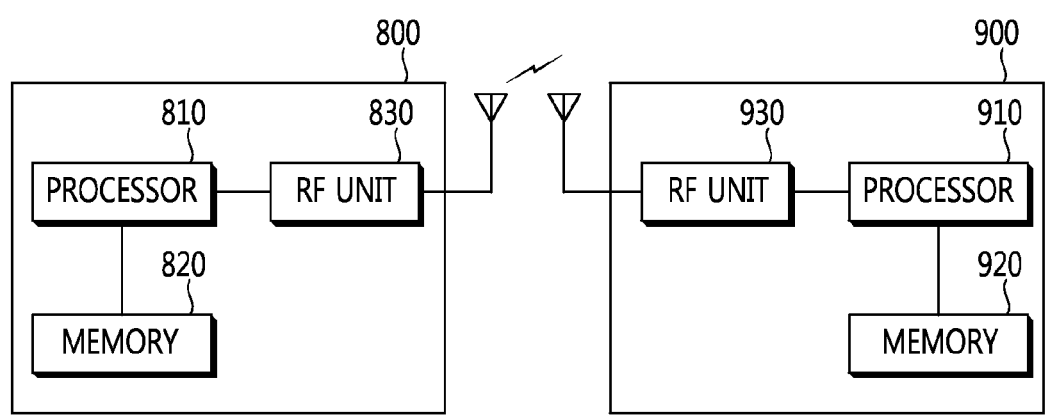
FIG. 13 is a block diagram showing wireless communication system to implement an embodiment of the present invention.

FIG. 13 is a block diagram showing wireless communication system to implement an embodiment of the present invention.

ABS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a user equipment (UE), backoff in a wireless communication system, the method comprising:
identifying a prioritized access;
receiving a backoff parameter, a special backoff parameter, and a probability factor from a network,
wherein the backoff parameter and the special backoff parameter are received together via one random access response message; and
determining whether or not to apply the received backoff parameter according to the special backoff parameter, the prioritized access and the received probability factor,
wherein a Medium Access Control (MAC) protocol data unit (PDU) for the random access response message includes a special backoff indicator field for indicating an existence of the special backoff parameter in a MAC subheader.

2. The method of claim 1, wherein the prioritized access corresponds to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

3. The method of claim 1, wherein it is determined to not apply the received backoff parameter if the prioritized access is identified.

4. The method of claim 3, further comprising: ignoring the received backoff parameter before transmitting a random access preamble to the network.

5. The method of claim 1, wherein it is determined to apply the received backoff parameter if the prioritized access is not identified.

6. The method of claim 5, further comprising: performing backoff based on the received backoff parameter before transmitting a random access preamble to the network.

7. The method of claim 1, wherein it is determined to not apply the received backoff parameter for the prioritized access if the received backoff parameter has a larger value than a specific value.

8. The method of claim 1, wherein it is determined to apply the received backoff parameter for the prioritized access if the received backoff parameter has a value equal to a specific value or a lower value than the specific value.

9. The method of claim 1, further comprising: receiving an indication of one or more access classes from the network; and wherein whether or not to apply the received backoff parameter is determined further according to the indication of one or more access classes.

10. The method of claim 1, further comprising: receiving a backoff configuration from the network via one of system information, a paging, and a radio resource control (RRC) connection reconfiguration message.

11. The method of claim 10, wherein the backoff configuration indicates the prioritized access.

12. A user equipment (UE) in a wireless communication system, the UE comprising:
a radio frequency (RF) unit that transmits and receives a radio signal; and
a processor, coupled to the RF unit, that:
identifies a prioritized access;
controls the RF unit to receive a backoff parameter, a special backoff parameter, and a probability factor from a network,
wherein the backoff parameter and the special backoff parameter are received together via one random access response message; and
determines whether or not to apply the received backoff parameter according to the special backoff parameter, the prioritized access and the received probability factor,
wherein a Medium Access Control (MAC) protocol data unit (PDU) for the random access response message includes a special backoff indicator field for indicating an existence of the special backoff parameter in a MAC subheader.

13. The UE of claim 12, wherein the prioritized access corresponds to one of emergency access, high priority access, control element/information in media access control (MAC), radio link control (RLC) or packet data convergence protocol (PDCP), data radio bearer (DRB) for voice/video service, signaling radio bearer (SRB) 0, SRB 1, SRB 2, multimedia telephony service (MMTEL)-voice, MMTEL-video, and voice over long-term evolution (VoLTE).

* * * * *